April 28, 1970  D. H. GILL  3,508,593

HEADLAMP ADJUSTING SCREW AND NUT ASSEMBLY

Filed Aug. 6, 1968

INVENTOR.
Donald H. Gill
BY
E. J. Biskup
ATTORNEY

3,508,593
**HEADLAMP ADJUSTING SCREW
AND NUT ASSEMBLY**
Donald H. Gill, St. Clair Shores, Mich., assignor to
General Motors Corporation, Detroit, Mich., a corporation of Delaware
Filed Aug. 6, 1968, Ser. No. 750,648
Int. Cl. F16b 39/28
U.S. Cl. 151—41.75                            2 Claims

ABSTRACT OF THE DISCLOSURE

A fastening device which in its preferred form is used for adjustably positioning a headlamp relative to a headlamp housing and includes a one-piece plastic nut fixedly mounted on the headlamp housing and an adjusting screw threaded through the nut and having a head portion connected to the headlamp. The nut includes deflectable shank elements extending through a mounting hole formed in the housing. A plurality of inwardly extending lands and ribs are formed along a centrally located bore section of the nut. A threaded portion of the adjusting screw is initially inserted into the bore section at the shank end and successively taps threads in the lands and ribs. As the screw is threaded across the lands, the shank elements are spread outwardly such that a portion thereof and the head of the nut compressively engage the spaced surfaces of the housing to fixedly secure the adjusting nut and screw thereto. As the screw is threaded across the ribs, the shank elements additionally deflect to accommodate realignment of the screw with the axis of the adjusting nut.

---

Presently, a pair of adjusting screws and nuts are used for selectively positioning a headlamp about horizontal and vertical axes. Because of the precise alignment required for proper optical aiming, an adjusting screw and nut must meet numerous performance capabilities, the foremost being that the adjusting screw and nut maintain a fixed relationship between the headlamp and the housing under all motor vehicle operating conditions. Additionally, the adjusting screw must be easily and accurately adjustable relative to the nut so that the proper optical aim for the headlamp can be established within the accepted aiming tolerances in a minimum amount of time. Moreover, the components must not be subject to corrosive deterioration over the life of the vehicle.

Previous headlamp constructions have incorporated an elastic one-piece nut member in combination with a metallic adjusting screw to solve the above noted corrosion problem. These nuts were inserted forwardly through suitably shaped apertures to a position wherein a head portion of the nut engaged the rear surface of the headlamp housing to limit forward axial movement of the nut and to act as load bearing surfaces as the screws were tightened. However, with this construction, it was not altogether possible to prevent radial and angular movement of the adjusting nut in the mounting hole. Consequently, difficulties were encountered in maintaining optical aim. These assemblies also required a prethreaded bore for accommodating the adjusting screw. Due to normal manufacture tolerances, the breakaway, insertion and withdrawal torques were somewhat unpredictable and irregular. Inasmuch as proper optical aiming of the headlamp oftentimes requires minute angular increments in the position of the adjusting screw, any fluctuating adjusting torques will hinder precise adjustment and increase the time required for obtaining the desired aim.

It is a general object of the present invention to provide an adjusting screw and nut assembly overcoming the above noted problem and, in particular, to provide a fastening device which is stably mounted in assembly, has controllable adjusting torque characteristics, and is not subject to corrosive deterioration. To this end, the present invention incorporates a snap-in plastic nut and an adjusting screw threaded therethrough. The nut includes a plurality of shank elements which are pressed through a suitably shaped aperture in the headlamp housing. Prior to the installation of the adjusting screw, a portion of the shank elements and the head of the nut engage the spaced surfaces of the housing to anchor the nut thereto. The rigid head section of the nut engages the rear surface of the housing and, inasmuch as the adjusting screw and nut experience primarily tensile loading in assembly, a stable load bearing surface is thereby provided. A plurality of inwardly extending lands and ribs are formed along a centrally located bore section of the nut. The adjusting screw is initially inserted at the shank end and, as the shank portion cuts threads along the lands, the shank elements are deflected outwardly such that a portion thereof compressively engages the front surface of the housing to securely lock the nut to the housing and prevent axial and radial movement under vehicle operating conditions. Upon continued insertion, the shank portion cuts threads in the ribs. Inasmuch as the ribs are formed in the relatively rigid head of the nut and the shank elements are relatively flexible, the shank elements additionally deflect to accommodate realignment of the adjusting screw with the axis of the nut to compensate for any misalignment that may have previously occurred. By threading the nut in assembly, the effects of any errors in original manufacture are minimized. Moreover, the lands and the ribs function as controlled bearing surfaces and are relatively sized to establish constant and predictable adjusting and breakaway torques for the aiming assembly.

The above and other objects will be apparent to one skilled in the art upon reading the following detailed description, reference being made to the accompanying drawings in which.

Figure 1:
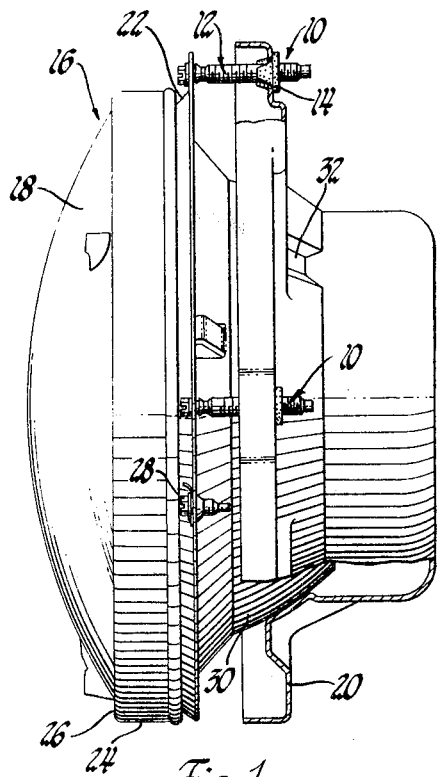
FIGURE 1 is a partially sectioned side elevational view of a headlamp assembly incorporating the fastening device of the present invention.

Referring to FIGURE 1, a fastening device 10 in the form of an adjusting screw 12 and an adjusting nut 14 is shown incorporated on a motor vehicle headlamp assembly 16. As is conventional, two fastening devices are provided at each headlamp assembly for selectively positioning a sealed beam headlamp 18 relative to a headlamp housing 20 about the horizontal and vertical axes. More specifically, the headlamp 18 is secured to a mounting ring 22 by a retaining ring 24 which has a rim 26 at one end engaging the outer periphery of the headlamp 18 and has the other end secured to the mounting ring 22 by fasteners 28. The mounting ring 22 includes a rearward spherical portion 30 that engages a plurality of bearing surfaces 32 formed on the headlamp housing 20. The spherical portion 30 cooperates with the bearing surfaces 32 to permit universal positioning of the headlamp 18 upon selective adjusting of the fastening devices 10.

Figure 2:
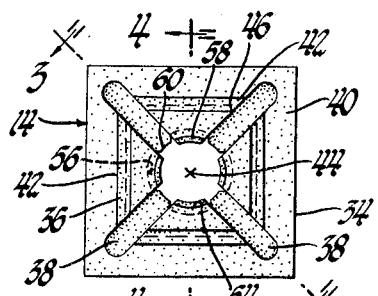
FIGURE 2 is an enlarged front view of the adjusting nut shown in FIGURE 1.

Referring to FIGURE 2, the adjusting nut 14 is a one-piece member formed of a suitable plastic material such as acetic resin and comprises a generally rectangular head 34 and an axially extending shank 36. A pair of slots 38 are formed along the longitudinal extent of the shank 36 and in the front surface 40 of the head 34. The slots 38 define opposed pairs of deflectable shank elements 42. It has been found that recessing the slots 38 in the head 34 will provide greater flexibility for the shank elements 42. As illustrated, the planes of the slots 38 perpendicularly intersect each other at a line substantially coincidental with the axis 44 of the adjusting nut 14.

Figure 5:
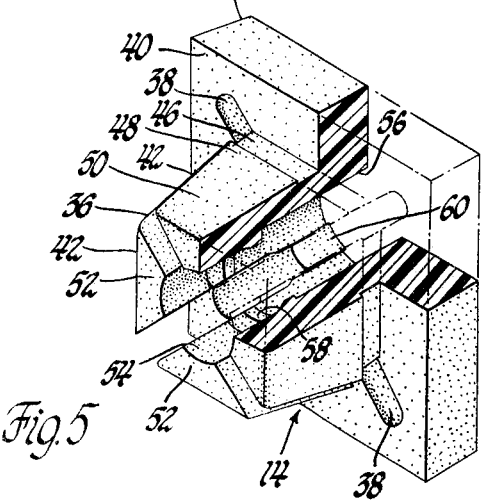
FIGURE 5 is a partially sectioned perspective view of the adjusting nut shown in FIGURE 2.

Referring to FIGURE 5, a recessed groove 46 is formed in each shank element 42 adjacent the head 34. Each groove 46 defines a radially outwardly extending shoulder 48 that is spaced from the front surface 40 a distance substantially equal to the thickness of the housing 20. The outwardly facing surfaces 50 of each shank element 42 taper inwardly from the shoulder 48 to the front face 52. The tapered configuration facilitates installation of the nut in a manner to be explained below.

The adjusting nut 14 includes a centrally located bore section comprising a first bore 54 formed at the forward end of the shank elements 42 and a second bore 56 formed coaxial therewith in the head 34 and adjacent portion of the shank 36. The second bore 56, as shown in FIGURE 2, has a diameter larger than the first bore 54. A plurality of radially inwardly extending arcuate lands 58 are formed at the surface of the first bore 54 adjacent the second bore 56. A plurality of radially inwardly extending arcuate ribs 60 are formed along the surface of the second bore 56 adjacent the ends of the slots 38. As shown in FIGURE 2, the lands 58 and the ribs 60 are alternately equally spaced with respect to the axis 44.

Figure 3:
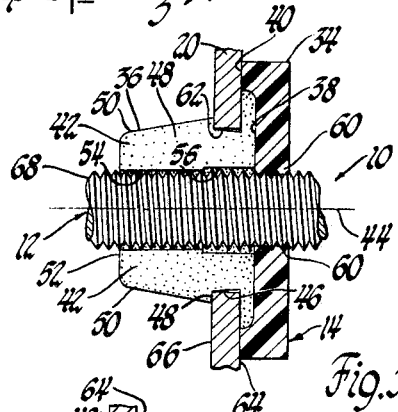
FIGURE 3 is a view of the fastening device taken along line 3—3 in FIGURE 2.

Referring to FIGURE 3, the adjusting nut 14 is assembled to the housing 20 by pressing the shank elements 42 forwardly through a rectangular mounting hole 62 formed in the housing 20. The size of the front face 52 is slightly smaller than the mounting hole 62 so that the adjusting nut 14 can be preliminarily aligned prior to insertion. During the insertion of the adjusting nut 14 into the mounting hole 62, the tapered configuration of the surface 50 acts to inwardly deflect the shank elements 42. When the front surface 40 of the head 34 engages the rear surface 64 of the housing 20, the internal elastic forces of the plastic material restore the shank elements 42 to their molded position wherein the shoulders 48 engage the front surface 66 of the housing 20. The cross-sectional shape of the groove 46 is substantially equal to that of the mounting hole 62. Thus, prior to insertion of the adjusting screw 12, the groove 46 prevents angular movement of the adjusting nut 14, and the shoulder 48 and the head 34 cooperate to prevent axial withdrawal of the adjusting nut 14.

Figure 4:
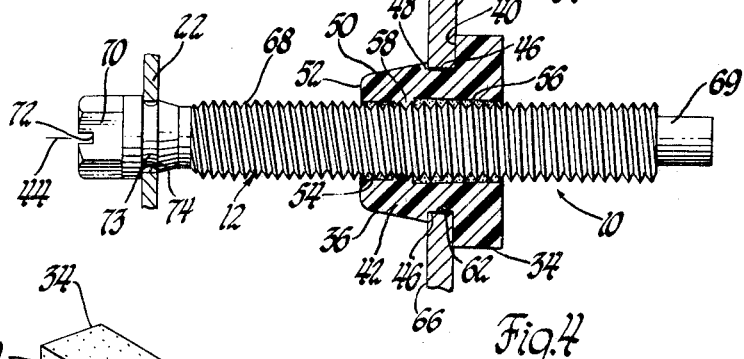
FIGURE 4 is a view of the fastening device taken along line 4—4 in FIGURE 2.

The adjusting screw 12 is formed of a suitable metal such as steel and has a protective phosphate coating to minimize the effects of corrosion. As shown in FIGURE 4, the adjusting screw 12 includes a shank portion 68 including a terminal dog point 69 and a head portion 70. The shank portion 68 has a helical screw thread formed thereon adapted to form complementary threads in the lands 58 and the ribs 60. The head portion 70 has a non-circular cross section for accommodating a driving tool and a transverse slot 72 for accommodating an adjusting tool. The head portion 70 further includes an annular groove 73 which is received within a slot 74 formed in the mounting ring 22. As will be appreciated, selective axial movement of the adjusting screw 12 will cause a corresponding movement of the mounting ring 22.

To assemble the adjusting screw 12 to the adjusting nut 14, the dog point 69 is inserted into the first bore 54 to axially align the shank portion 68 with the axis 44. Upon initial rotation, the shank portion 68 is threaded across the lands 58 thereby radially outwardly spreading the shank elements 42 and additionally biasing the shoulders 48 in to secure compressive engagement with the housing 20. Thereafter and as shown in FIGURE 3, the shank portion 68 is threaded through the ribs 60 and rearwardly of the head 34. Inasmuch as the head 34 is relatively rigid and the shank 36 is relatively flexible, any axial misalignment of the adjusting screw 12 during threading through the lands 58 is corrected as the shank portion 68 is threaded through the ribs 60. In other words, the shank 36 will additionally deflect to accommodate realignment as the adjusting screw is threaded through the immovable head 34.

Adjustable fastening devices having the above noted characteristics and advantages have been successfully incorporated on headlamp assemblies using the following dimensions:

Size of the mounting hole 62—.420 inch, square
Size of the grooved surface 46—.415 inch, square
Diameter of the first bore 54—.223 inch
Diameter of the second bore 56—.252 inch
Size of the lands 58—30° arcuate segments, .185 inch diameter
Size of the ribs 60—30° arcuate segments
Width of the grooved surface 46—.080 inch
Thickness of the housing 20—.075 inch
Size of screw thread 68—¼–28 UNF–2A Although only one form of this invention has been shown and described, other forms will be readily apparent to those skilled in the art. Therefore, it is not intended to limit the scope of this invention by the embodiment selected for the purpose of this disclosure.

What is claimed is:

1. An adjusting screw and nut assembly for adjustably positioning a headlamp relative to a housing to thereby achieve proper optical aim for the former, comprising: a one-piece nut member formed of a plastic material, said nut member having a non-circular shank axially insertable through a complementary mounting hole formed in said housing, a head extending radially outward from one end of the shank, a first axial bore formed at the other end of the shank, a second axial bore having a diameter greater than said first axial bore formed in the head and said one end of the shank coaxial with and terminating at said first bore, slots formed longitudinally through said shank and in an adjacent portion of said head, said slots being positioned in planes intersecting each other at a line substantially coincidental with the axis of said first and second bores and defining diametrically opposed pairs of shank elements, a radially outwardly extending shoulder on each of said shank elements, a planar bearing surface formed on said head on the side adjacent said shank adapted for compressive engagement with an oppositely facing surface of said housing, said shoulders being axially spaced from said head a distance substantially equal to the thickness of said housing to limit axial movement of the nut member, said shoulders adapted upon radially outward spreading of said shank elements to compressively engage the other surface of said housing, a portion of the shank between said bearing surface and the shoulders being substantially the shape of said mounting hole to limit angular movement therewithin, a land formed on each shank element along said first bore adjacent to said second bore and circumferentially spaced with respect to said slots, a plurality of axially extending ribs formed in the head along the second bore and adjacent said slots; and an adjusting screw member operatively threaded through said nut member, said screw member having a thread forming shank portion and a head portion adapted to be connected to said headlamp for moving the latter in response to movement of said adjusting screw member, said head portion having a configuration accommodating a driving and adjusting tool, said shank portion having an outer diameter smaller than said second bore and larger than said lands and said ribs, said shank portion initially entering said first bore and tapping said lands thereby radially outwardly spreading said shank elements and urging said shoulders into compressive engagement with said other surface of said housing, said spreading of said shank elements preventing axial withdrawal of said nut member and said adjusting screw member from said housing, said shank portion upon further insertion engaging and tapping said ribs, said shank elements flexing to accommodate alignment of said shank portion substantially coaxial with said second bore in final assembly.

2. The invention recited in claim 1 wherein said plurality of axially extending ribs formed in said head portion along said second bore are circumferentially aligned with said slots formed longitudinally through said shank.

References Cited
UNITED STATES PATENTS

| | | | |
|---|---|---|---|
| 2,545,514 | 3/1951 | Erb | 85—84 |
| 3,139,251 | 6/1964 | Walsh | 240—416 |
| 3,358,551 | 12/1967 | Seckenson | 85—80 |

FOREIGN PATENTS 707,819   4/1954   Great Britain.

EDWARD C. ALLEN, Primary Examiner

U.S. Cl. X.R.

151—7